United States Patent
Holmanu

(10) Patent No.: US 9,679,538 B2
(45) Date of Patent: Jun. 13, 2017

(54) EYE DISPLAY INTERFACE FOR A TOUCH DISPLAY DEVICE

(71) Applicant: Intel IP Corporation, Santa Clara, CA (US)

(72) Inventor: Bogdan Constantin Holmanu, Unterhaching (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/316,645

(22) Filed: Jun. 26, 2014

(65) Prior Publication Data
US 2015/0379963 A1    Dec. 31, 2015

(51) Int. Cl.
| | |
|---|---|
| *G06F 3/14* | (2006.01) |
| *G09G 5/12* | (2006.01) |
| *G02B 27/01* | (2006.01) |
| *G09G 3/00* | (2006.01) |
| *G06F 1/32* | (2006.01) |

(52) U.S. Cl.
CPC ............ *G09G 5/12* (2013.01); *G02B 27/017* (2013.01); *G06F 3/1454* (2013.01); *G09G 3/001* (2013.01); *G02B 2027/0178* (2013.01); *G06F 1/3265* (2013.01); *G09G 2354/00* (2013.01); *G09G 2358/00* (2013.01); *Y02B 60/1242* (2013.01)

(58) Field of Classification Search
None
See application file for complete search history.

(56) References Cited

U.S. PATENT DOCUMENTS

| | | | |
|---|---|---|---|
| 8,502,780 B1* | 8/2013 | Park | G06F 3/04886 345/165 |
| 2011/0016405 A1* | 1/2011 | Grob | H04N 1/00127 715/740 |
| 2013/0147686 A1* | 6/2013 | Clavin | G06F 3/013 345/8 |
| 2014/0193037 A1* | 7/2014 | Stitzinger | G09G 5/12 382/103 |
| 2015/0119108 A1* | 4/2015 | Philbin | H04W 52/0274 455/566 |

OTHER PUBLICATIONS

"Press Release: Wearable Depth-Sensing Projection System Makes Any Surface Capable of Multitouch Interaction. Researchers From Microsoft Research and Carnegie Mellon Create OmniTouch Technology," *Carnegie Mellon News*, Oct. 17, 2011. Online at: http://www.cmu.edu/news/stories/archives/2011/october/oct17_omnitouch.html.

* cited by examiner

*Primary Examiner* — Patrick Edouard
*Assistant Examiner* — Matthew Yeung
(74) *Attorney, Agent, or Firm* — Blakely, Sokoloff, Taylor & Zafman LLP

(57) ABSTRACT

A wearable eye display device allows a user to use the touch interface of their touch display device while enjoying a personal view of the touch display device's display interface. During use the display screen of the touch display device is deactivated while the touch interface remains active. The wearable eye display device enables the touch display device to be used with greater privacy since the display screen is not observable to others while deactivated. In addition, power consumption is reduced since the touch display device consumes less power when viewing the display interface on the wearable eye display device instead of on the touch display device's larger display area.

13 Claims, 7 Drawing Sheets

EYE DISPLAY INTERFACE FOR A TOUCH DISPLAY DEVICE

TECHNICAL FIELD

The technical field is user interfaces for touch display devices, particularly eye display interfaces.

BACKGROUND

Wearable display devices in the form of eyewear designed to display information on the eyewear's lenses for personal viewing have been undergoing rapid development in the last few years. Sometimes described as augmented reality devices, or smart glasses, the wearable display devices typically employ a camera, a processor and connectivity component, and a small screen on which to display visual information on the eyewear's lens (or lenses). The display of visual information overlays a real object detected in the wearer's field of vision, such as with images and/or text that identify or otherwise augment the viewer's perception of the object.

Wearable display devices have many potential applications. For example, wearable display devices are being specifically designed to provide users with hands free access to information related to their surroundings, such as technicians with technical specifications about the equipment they are operating or servicing, or travelers with navigation aids during their journey. In some applications, wearable display devices are being designed to provide users with hands free access to specific features of the device itself using voice commands or head movements, including such features as taking pictures or videos with the device, or sending messages to other devices.

Touch display devices in the form of smart phones, tablets, laptops or other digital devices are now ubiquitous. As users take their devices with them into public places, the need to secure the devices against unauthorized use becomes more acute. Typically, devices are secured through some sort of device lock that requires the user to enter via the device's touch display interface a secret security code, such as a password, personal identification number or passcode that functions as a key to unlock the device. This allows the user to be authenticated as an authorized user of the device before it is unlocked. However, unlocking the device in a public space renders the secret security code vulnerable to observation attacks.

In addition to being ubiquitous, the use of advanced microprocessors in touch display devices continues to grow, with larger and higher definition display areas to support. The advanced microprocessors, with more transistors and higher frequencies, results in corresponding increases in power and energy consumption. Particularly in mobile devices, such as tablet computers and smart phones etc., increased power consumption can lead to overheating, which can negatively affect performance and significantly reduce battery life. Because batteries typically have a limited capacity, running the processor of a mobile device more than necessary could drain the capacity more quickly than desired.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
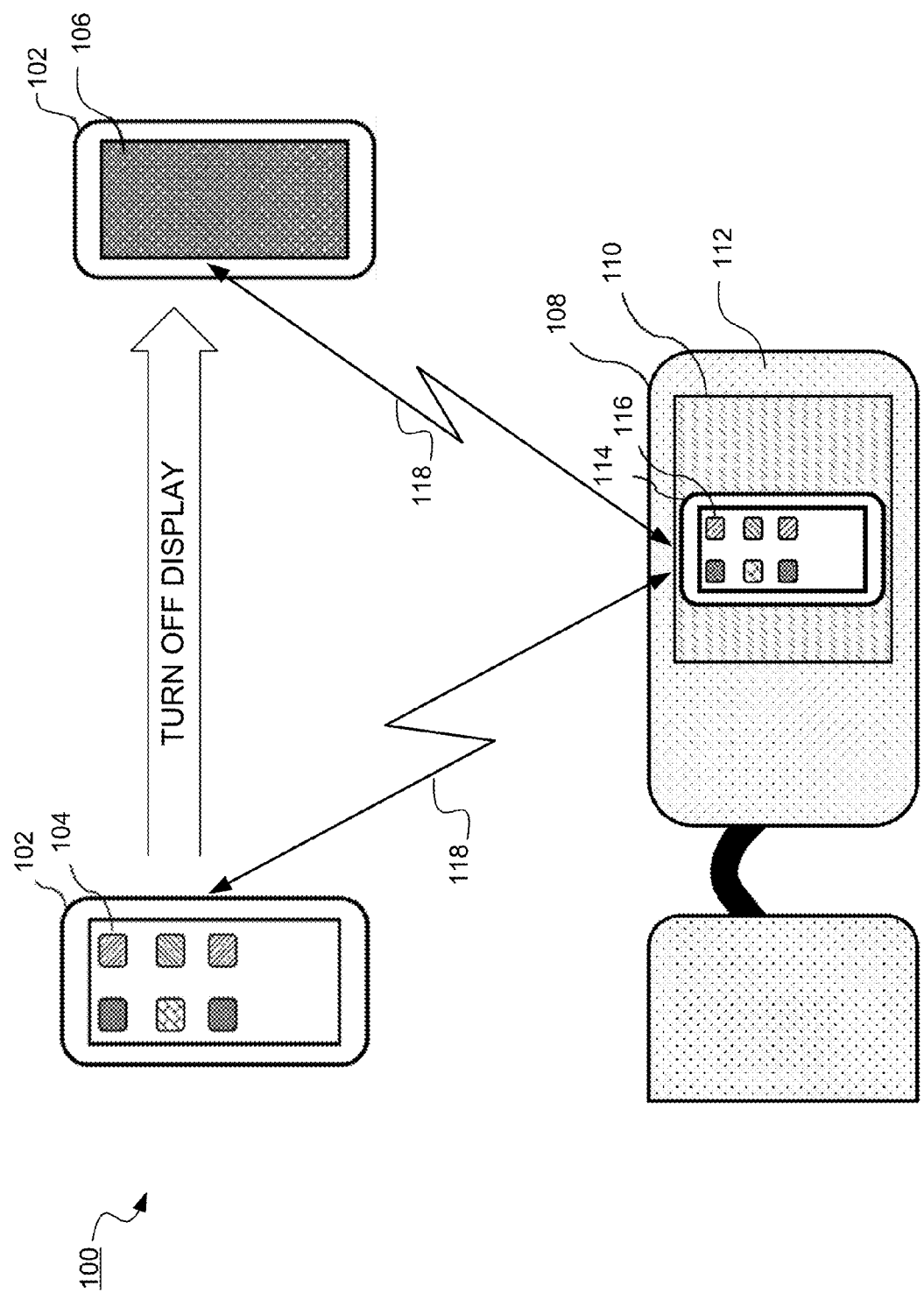
FIG. 1 illustrates of an overview of an exemplary eye display interface system in which a touch display device is placed into a dimmed state while the display portion of the touch display interface is re-created on an eye display device in accordance with embodiments of the invention.

In touch display devices the display is responsible for approximately fifty percent (50%) of power consumption. In addition, as with any mobile device, privacy is a concern when using a touch display device in public, particularly in crowded environments. At the same time, wearable display devices such as augmented reality devices, or smart glass devices, are able to display digital information on the eyewear's lenses for personal viewing while allowing the wearer to also maintain a normal view of their surroundings and objects in their field of vision.

In keeping with these observations, a novel eye display interface to a touch display device is described in which a wearable eye display device enables private viewing of the display interface of a touch display device by separating the touch interface from the display interface. During use, the display interface of the touch display device is viewed through the wearable eye display device while the normal display is deactivated. Since touch interface remains active, the user can interact with the device as they normally would.

In one embodiment, the touch interface is separated from the display interface by transmitting the display interface for re-creation on an eye display interface of the wearable eye display device. During operation, the regular display of the touch display device can be dimmed or deactivated. The re-created display interface on the eye display interface of the wearable eye display device overlays the user's view of the touch display device, thereby allowing the user to continue to interact with the device as if the display interface was still displayed on the touch device's regular display. In this manner, the user is afforded privacy when interacting with their touch display device.

Operating a touch display device using an eye display interface to take the place of the regular display advantageously reduces the power consumption of the touch display device because its display can be dimmed or deactivated. Since the display area of the eye display interface is much smaller than the regular display area of the touch device's display screen, it consumes less power to display a user interface or other content on the wearable eye display device than on a typical touch display device.

Past efforts at alternative interfaces to touchable interfaces include projection systems that have attempted to replicate a touch display interface by projecting a display of the interface onto a non-sensitive touchable surface, such as a sheet of paper or a wall. Such projection systems typically use a stereoscopic camera system to detect the touch operation on the non-sensitive surface.

In contrast, the described embodiments of the novel eye display interface to the touch display device retain the existing touch interface of the touch display device. Thus, only the display interface is re-created on the wearable eye display device. This advantageously eliminates the need to replicate the touch operation functionality using a stereoscopic camera system.

In the described embodiments of the eye display interface to a touch display device, a camera of the wearable eye display device is used in combination with position and/or orientation data obtained from the touch display device to first identify and then track the touch display device. Once identified and tracked, the touch display device transmits its display interface to the wearable eye display device for re-creation on the eye display area of the lens of the wearable eye display device. At the same time, the touch display device continues to support the touch operation of the touch interface.

Examples may include subject matter such as a method, means for performing acts of the method, an apparatus, and a system for an eye display interface to a touch display device, and at least one machine-readable medium including instructions that, when performed by a machine or processor, cause the machine or processor to performs acts of the method according to embodiments and examples described herein.

In one embodiment, a system for an eye display interface to a touch display device includes a communications interface, a touch display device such as a hand-held device having an touch display interface, and a wearable eye display device, also referred to as a personal viewing device, having a camera integrated with a wearable lens on which to display a personal view of the hand-held device. The respective processors of the hand-held device and the personal viewing device interoperate via the communications interface to separate the touch display interface of the hand-held device into a touch only interface and a display-only interface, the touch-only interface remaining operable on the hand-held device while the display-only interface is displayed on the wearable lens in the personal view of the personal viewing device.

In one embodiment, the system separates the touch display interface of the hand-held device into the touch only interface on the hand-held device and the display-only interface on the personal viewing device by means of any one or more of redirecting visible content displayed on the touch display interface from the hand-held device to the personal viewing device, displaying the redirected visible content in an eye display interface superimposed over the personal view of the hand-held device, synchronizing the personal view of the hand held device with a current location of the hand held device, receiving touch input via the touch-only interface of the hand held device, the touch input guided by the redirected visible content displayed in the eye display interface superimposed over the personal view of the hand-held device, and updating the redirected visible content based on the touch input, where the updated redirected visible content displayed in the eye display interface is superimposed over the personal view of the display-only interface.

In one embodiment of the system, the communications interface over which the hand-held device interoperates with the personal viewing device supports transmission of any one or more of video, graphical, audio, and other types of data over short ranges.

In one embodiment, a personal viewing device of the system can include a wearable eye display device for performing the methods and implementing the systems described herein, and comprises a processor coupled to a camera and a wearable lens having an eye display interface. The processor of the wearable eye display device includes, among other components, a connectivity component, an image component and a display interface component, the components operating in conjunction with the camera, the wearable lens and the eye display interface, as well as other elements of the system, to perform the methods described herein.

In one embodiment of the wearable eye display device, the connectivity component operates to establish a data link with a touch display device in communication with the wearable eye display device. The image component receives from the camera an image composed of objects captured in the camera's field of view, the objects including a touch display device, the touch display device having a touch interface integrated with a display interface. The image component operates to synchronize the eye display interface with the display interface based on the image.

In one embodiment of the wearable eye display device, the display interface component receives the display interface via the data link and generates the display interface on the eye display interface of the wearable lens. The display interface further commands the touch display device to deactivate the display interface on the touch display device while maintaining the touch interface. Because the touch interface of the touch display device is maintained, a user is able to use the touch interface of the touch display device while viewing the display interface on the eye display interface of the wearable lens.

In one embodiment of the wearable eye display device, to synchronize the eye display interface with the display interface based on the image, the camera detects a graphical pattern appearing in the image, and the image component of the processor identifies the graphical pattern as having been generated on the display interface of the touch display device in the camera's field of view. The image component of the processor configures the eye display interface to overlay the display interface based on where the graphical pattern appeared in the image. The image component of the processor tracks a location of the touch display device within the camera's field of view based on position and orientation data received from the touch display device via the data link, and re-configures the synchronized eye display interface to overlay the display interface based on the tracked location of the touch display device.

In one embodiment of the wearable eye display device, the image component of the processor can determine that the eye display interface is no longer synchronized with the display interface, in which case the image component re-synchronizes the eye display interface with the display interface based on an updated image. In one embodiment, to re-synchronize the eye display interface based on the updated image is to command the touch display device to re-activate the display interface and generate the graphical pattern, and to receive from the camera the updated image composed of objects captured in the camera's field of view, including the touch display device. The image component of the processor then detects the graphical pattern appearing in the updated image, identifies the graphical pattern as having been generated on the display interface, and re-configure the eye display interface to overlay the display interface based on where the graphical pattern appears in the updated image.

In one embodiment a method for an eye display interface to a touch display device comprises a personal viewing device interoperating with a touch display device to provide the eye display interface. The personal viewing device, such as a smart glass device, includes a camera, a processor, and a lens on which to display the eye display interface for a touch display device having a display interface and a touch interface. In this method the smart glass device establishes a connection with the touch display device, captures an image of objects in the camera's field of view, the objects including the touch display device, and synchronizes the eye display interface with the display interface based on the image. In one embodiment, the method further generates the display interface on the eye display interface, receives updates to the display interface resulting from user interaction with the touch interface, and re-generates the display interface on the eye display interface to reflect any updates.

In one embodiment, the method for synchronizing the eye display interface with the display interface based on the image comprises detecting a graphical pattern appearing in the image, identifying the graphical pattern as having been generated on the display interface, and configuring the eye display interface to overlay the display interface based on where the graphical pattern appeared in the image. In one embodiment the smart glass device receives location data describing a position and orientation of the touch display device via the connection, in which case the method for synchronizing the eye display interface with the display interface may also be based on the location data.

In one embodiment the smart glass device may determine that the eye display interface is no longer synchronized with the display interface, in which case the method re-synchronizes the eye display interface with the display interface based on an updated image. In one embodiment, the method for re-synchronizing the eye display interface based on the updated image is to command the touch display device to re-activate the display interface and generate the graphical pattern and receive from the camera the updated image, the updated image composed of objects captured in the camera's field of view, the objects including the touch display device. In one embodiment the method for re-synchronizing further includes detecting the graphical pattern as captured in the updated image, identifying the graphical pattern as having been generated on the display interface, and re-configuring the eye display interface to overlay the display interface based on where the graphical pattern was captured in the updated image.

In one embodiment of the system, the touch display device includes any device having a touch display interface, such as a hand-held mobile device, mobile communications device, tablet device, and the like, with which a personal viewing device can be used. In one embodiment, the touch display device comprises a connectivity component to establish a connection with a personal viewing device, the personal viewing device having a camera, a processor, and a lens on which to display a personal view of the touch display interface.

In one embodiment, the touch display device further includes a processor to generate a graphical pattern on the touch display interface, where the graphical pattern is used to distinguish the touch display device from other objects within a viewing range of the personal viewing device. The touch display device is able to receive a synchronization notification from the personal viewing device that a personal view of the touch display interface has been synchronized with a current location of the touch display device, as well as able to transmit visible content displayed on the touch display interface to the personal viewing device via the connection established between the devices.

In one embodiment, while the personal viewing device is in use, the touch display device is able to remove the display of the visible content from the touch display interface of the touch display device, receive touch input to the touch display interface, and transmit to the personal viewing device, via the connection, any updated visible content resulting from the touch input to the personal viewing device.

From time to time, in one embodiment, the touch display device may receive from the personal viewing device a re-synchronization notification to re-synchronize the current location of the touch display device with the personal view of the touch display interface. Responsive to the receipt of such notification, the touch display device is able to activate the display of the touch display interface on the touch display device and re-generate the graphical pattern thereon. The re-generation of the graphical pattern facilitates distinguishing the touch display device from other objects within viewing range of the personal viewing device. Thereafter, the touch display device may receive from the personal viewing device another synchronization notification that the personal view of the touch display interface has been synchronized with a current location of the touch display device, at which point the touch display device resumes transmission of visible content displayed on the touch display interface to the personal viewing device via the connection, and removes the display of the visible content from the touch display interface of the touch display device.

In one embodiment, the processor of the touch display device is further to collect position and orientation data generated by sensors in the touch display device, and transmit, via the connection, the collected position and orientation data to the personal viewing device for tracking a current location of the touch display device.

In one embodiment, the method for an eye display interface for a touch display device includes a method for the touch display device, such as a tablet or mobile telephone, in which the device's touch display interface can be separated into a touch-only interface and display-only interface. In this method, the touch display device establishes a connection with the personal viewing device, such as a smart glass device or wearable eye display device, when the touch display device comes into view of the personal viewing device. The personal viewing device has a camera, a processor, and a lens on which to display a personal view of the touch display interface. After generating a graphical pattern on the touch display interface to distinguish the device from other objects within viewing range of the personal viewing device, the touch display device begins receiving from the personal viewing device a synchronization notification that a personal view of the touch display interface has been synchronized with a current location of the touch display device.

In one embodiment, the touch display device commences transmitting to the personal viewing device, via the previously established connection, visible content that would normally be displayed on the touch display interface. In addition, the touch display removes the display of the visible content from the touch display interface since that content is now displayed on the personal viewing device.

In one embodiment, the touch display device receives touch input to the touch display interface. Any updated visible content resulting from the touch input is transmitted, via the previously established connection to the personal viewing device which, in turn, displays the updated visible content on the eye display interface so that the personal view of the touch display device is continuously updated in real-time or near real-time.

In one embodiment, the touch display device receives from the personal viewing device a re-synchronization notification to re-synchronize the current location of the touch display device with the personal view of the touch display interface. Upon receive of the notification, the touch display device activates the touch display interface on the touch display device and re-generates the graphical pattern to distinguish the touch display device from other objects within viewing range of the personal viewing device.

In one embodiment, the touch display device eventually receives from the personal viewing device another synchronization notification that the personal view of the touch display interface has been synchronized with the current location of the touch display device, at which time the touch display device resumes transmitting visible content to the personal viewing device via the connection, and again removes the display of the visible content from the touch display device.

In any one or more of the embodiments of the systems, apparatuses and methods herein described, the graphical pattern may be a randomly generated graphical pattern of a two-dimensional mesh of easily matched geometrical forms with reference points generated with a pseudorandom number generator.

In any one or more of the embodiments of the systems, apparatuses and methods herein described, location data, such as position and orientation data, is collected by the touch display device and transmitted to the personal viewing device for tracking a current location of the touch display device. In some embodiments, the location data may be obtained from any one or both of an accelerometer and a gyroscope operating on the touch display device. For example, any sensors from which the position and orientation data is collected may be any one or both of an accelerometer and a gyroscope.

In one embodiment, at least one computer-readable storage medium includes instructions that, when executed on one or more processors of any one or more of the aforementioned touch display or personal viewing devices, cause the processor(s) to perform any one of the methods herein described.

In one embodiment, a system for an eye display interface to a touch display device is comprised of a means for a hand held device having means for an touch display interface, means for separating the touch display interface into a touch-only interface and a display-only interface, means for a wearable eye display device having means for displaying a personal view of the display-only interface of the hand held device, means for synchronizing the personal view of the display-only interface of the hand held device with a current location of the hand held device, means for operating the touch-only interface of the hand held device based on the personal view of the display-only interface, and means for updating the personal view of the display-only interface based on results of operating the touch-only interface of the hand held device.

In one embodiment, the system for the eye display interface is further comprised of means in the wearable eye display device for capturing an image of the hand held device, wherein the means for synchronizing the personal view of the display-only interface of the hand held device with the current location of the hand held device is based on the captured image of the hand held device, the captured image containing a graphical pattern identifying the hand held device.

In one embodiment, the system for the eye display interface is further comprised of means in the hand held device for generating location data describing a position and orientation of the hand held device, as well as means in the wearable eye display device for receiving the location data, and means for synchronizing the personal view of the display-only interface with the current location of the hand held device based on the location data.

In one embodiment, the system for the eye display interface is further comprised of means for determining that the personal view of the display-only interface is no longer synchronized with the current location of the hand held device, means in the wearable eye display device for capturing an updated image of the hand held device, and means for re-synchronizing the personal view of the display-only interface with the current location of the hand held device based on the updated image.

FIG. 1 illustrates of an overview of an exemplary eye display interface system 100 in accordance with embodiments of the invention, in which a touch display device 102 having a touch display interface 104 comes into proximity with a wearable eye display device 108. Upon establishing a connection 118 with the wearable eye display device 108, the visible display portion of the touch display interface 104 is transmitted to the wearable eye display device 108 and re-created on the eye display interface 110 of the eye display lens 112. The re-created display 114 is updated with the current contents 116 of the touch display interface 104, and is perceived by the wearer of the eye display device as overlaid or superimposed on the actual display device in real-time. During operation of the eye display interface system 100 the touch display interface 104 may be placed into a non-displayable or dimmed state 106 to afford privacy and reduce power consumption.

Figure 2:
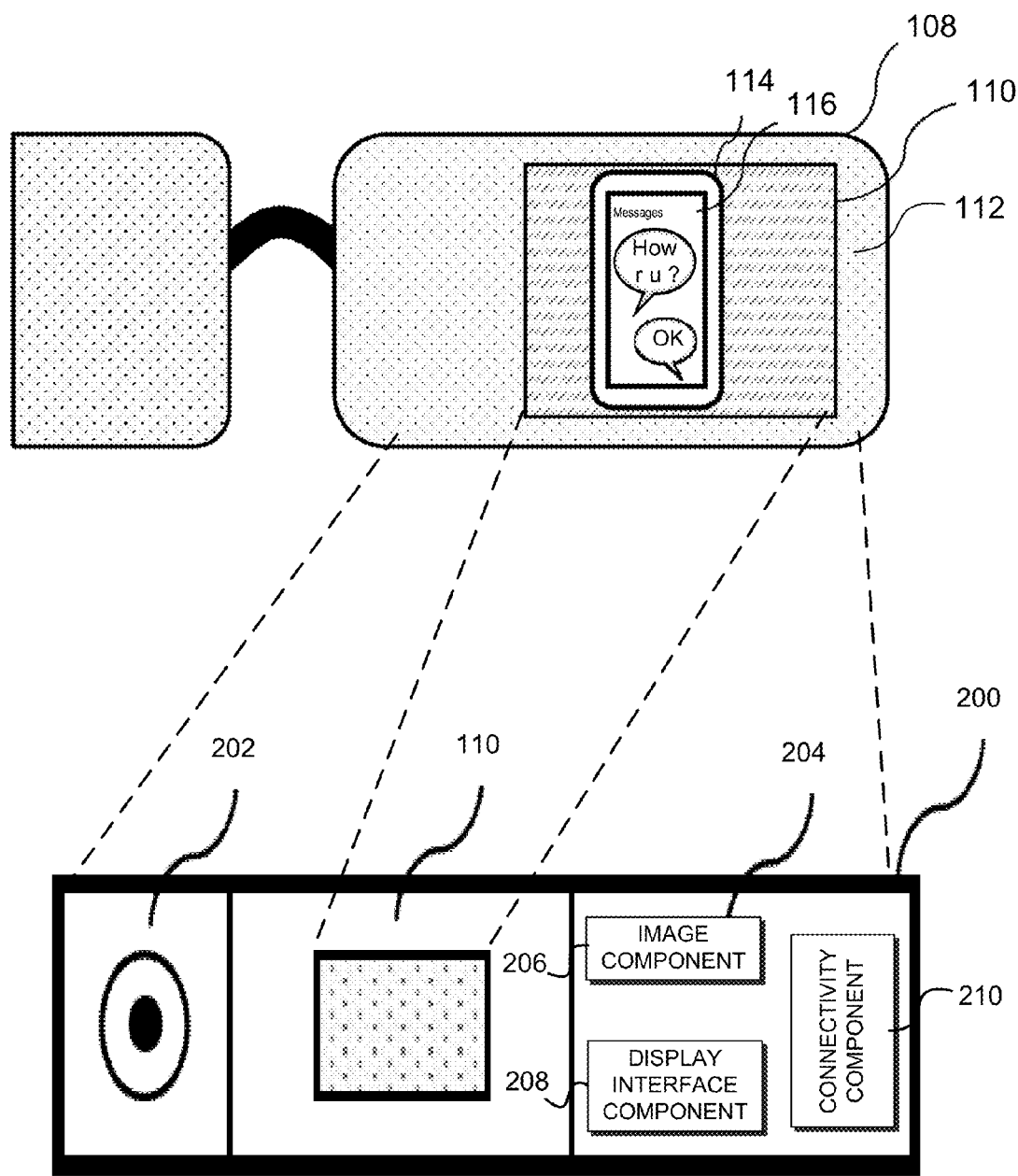
FIG. 2 illustrates the exemplary eye display device of FIG. 1 in further detail in which the display portion of the touch display interface is dynamically re-created on the eye display interface of an eye display device in accordance with embodiments of the invention.

FIG. 2 illustrates in further detail selected components of the exemplary eye display interface system 100 in accordance with embodiments of the invention, and in which the wearable eye display device 108 is equipped with a smart glass component 200. The smart glass component 200 is mounted onto or otherwise affixed to the wearable eye display device 108 to carry out the functionality of the eye display interface system 100. Among other subcomponents, the smart glass component 200 provides a video camera 202, the aforementioned eye display interface 110 of the eye display lens 112, and a smart glass processor 204 having an image processing component 206, a display interface component 208 and a connectivity component 210 to support the operation of the eye display interface system 100.

In a typical embodiment, the video camera 202 obtains real-time images of the touch display device 102 for identification and tracking in preparation for re-creating the updated image of the touch display device on the wearable eye display as will be described in detail in FIGS. 3-6. The connectivity component 210 of the smart glass processor 204 establishes the connection with the touch display device 102. The image processor 206 of the smart glass processor 204 processes the real-time images obtained by the video camera 202, and the display interface component 208 of the smart glass processor 204 processes the data exchanged between the wearable eye display device 108 and the touch display device 102 to support the re-creation of the updated display 114/116 on the eye display interface 110 of the eye display lens 112.

In a typical embodiment, in order to carry out the functionality of the eye display interface system 100, the illustrated touch display device 102 is configured with programming interfaces for the collection, transmission and manipulation of the touch display interface 104, programming interfaces for establishing the connection 118 with the eye display device 108, where the connection 118 is capable of supporting video transmissions and other types of data over short ranges (e.g. Bluetooth, Universal Serial Bus, and Near Field Communication connections), and is further equipped with an accelerometer and gyroscope components that provide the data necessary for supporting the identification of and tracking the location of the touch display device 102 during use.

In a typical embodiment, the smart glass component 200 of the wearable eye display device 108 is configured with programming interfaces for the eye display interface 110 and video camera 202, where the programming interfaces expose functions of the corresponding display interface component 208 and image processing component 206 of the smart glass processor 204. Like the touch display device 102, the smart glass component 200 of the wearable eye display device 108 is also configured with programming interfaces for establishing the connection 118 between the devices such as the connectivity component 210 of the smart glass processor 204, where the connection 118 is capable of supporting video transmissions and other types of data over short ranges (e.g. Bluetooth, Universal Serial Bus, and Near Field Communication connections).

Taken together the interoperability of the touch display device 102 and wearable eye display device 108 provided by the novel eye display interface system 100 advantageously separates the touch display interface 104 into a display-only interface 116 re-created on the eye display device 108 and a touch-only interface 106 retained on the touch display device 102. By transferring the display from the touch display device 102 to the eye display device 108, the touch display device advantageously consumes less power and the user is afforded more privacy. Because the touch-only interface 106 functions of the touch display device 102 is retained, the touch operation is accurate. In addition, the functionality of the wearable eye display device 108 is not limited to only the computation power of the smart glass component 200. Moreover, by re-creating the display-only interface 116 on the eye display device 108, the user will be able to take advantage of the wearable eye display device 108 features to modify the size or position of the display-only interface 116 to suit their preferences, or otherwise enhance its functionality or appearance.

It should be noted that the successful operation of the eye display interface system 100 as thus far described is not without challenges. For example, the aforementioned identification of the touch display device 102 is typically performed using captured images and visual recognition techniques that employ graphical pattern matching algorithms. Such algorithms are processing intensive and can result in delays in visual recognition or identification.

To overcome this challenge, the smart glass component 200 of the novel eye display interface system 100 is designed to use the touch display device 102 accelerometer and gyroscope data provided over connection 118 to track the position and orientation of the device upon having been identified in the visual field of the wearable eye display device 108. In this manner, the tracking of the touch display device 102 position and orientation using accelerometer and gyroscope data complements the visual identification of the touch display device 102 using the images and graphical pattern captured by the camera 202.

Another challenge is that, because the touch display 104 of the touch display device 102 may be deactivated or dimmed during operation of the eye display interface system 100 to conserve power, the input data acquired by the camera 202, including the physical characteristics of the touch display device 102 used to distinguish it from other objects in the field of view, may become insufficient to support the visual recognition techniques employed in the eye display interface system 100. For example, there could be two identical touch display devices in the visual field, or the background visual field and touch display device could have similar graphical properties. To overcome this challenge, the eye display interface system 100 makes use of a random generated pattern that is "printed" on the touch display device 102 and transmitted to the smart glass component 200 during initialization of the identification and tracking algorithms.

In addition, during operation of the eye display interface system 100, the smart glass component 200 of the wearable eye display device 108 will periodically trigger resynchronization with the touch display device 102 by requesting the "re-printing" of the generated pattern. In a typical embodiment, the randomly generated graphical pattern is a two-dimensional mesh of easily matched geometrical forms (such as that illustrated in FIG. 1, 104/116), with the reference points generated with a pseudorandom number generator.

Figure 3:
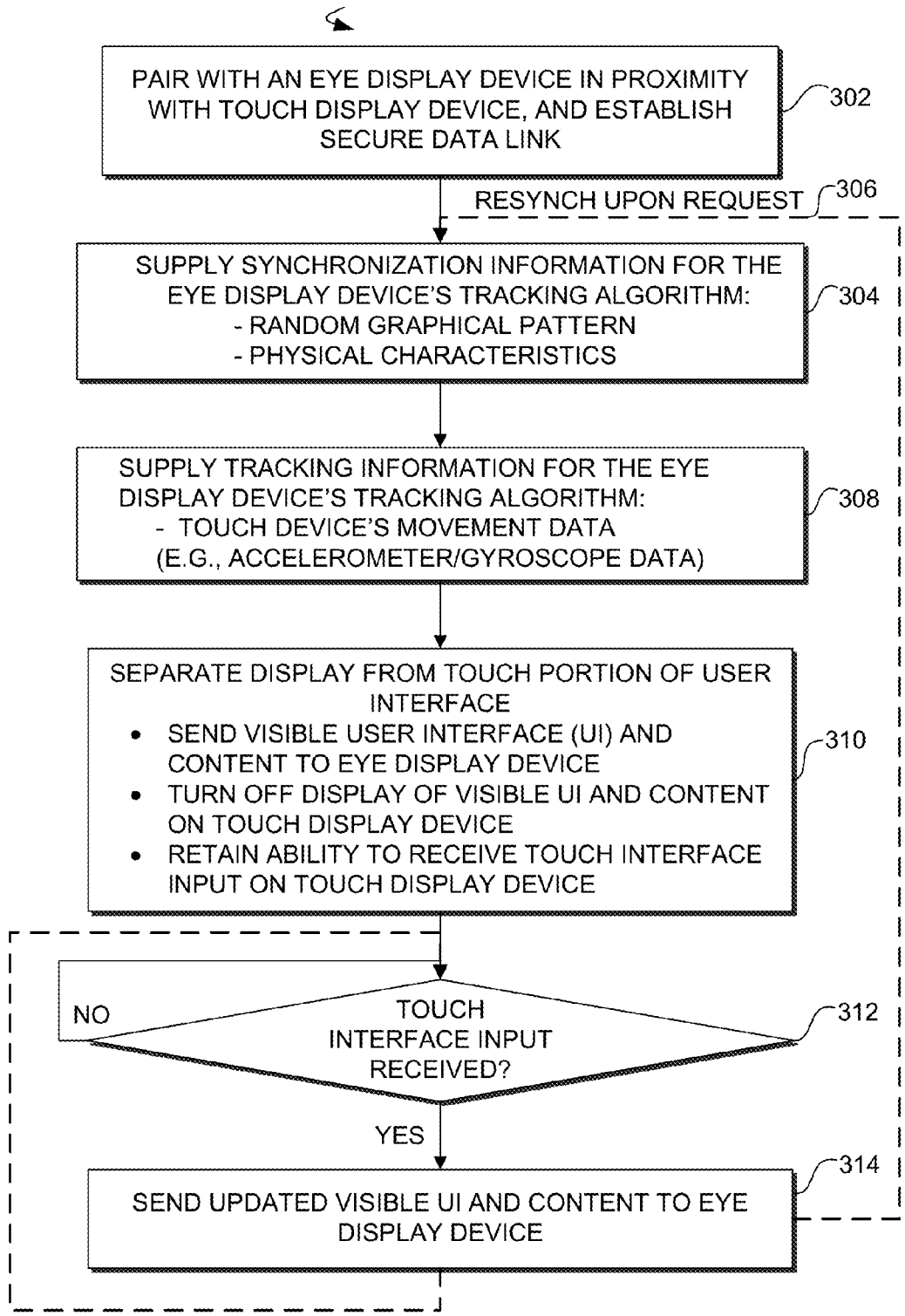
FIG. 3 is a flow diagram illustrating a process that may be utilized in a touch display device to operate in conjunction with an eye display device, in accordance with embodiments of the invention.
Figure 4:
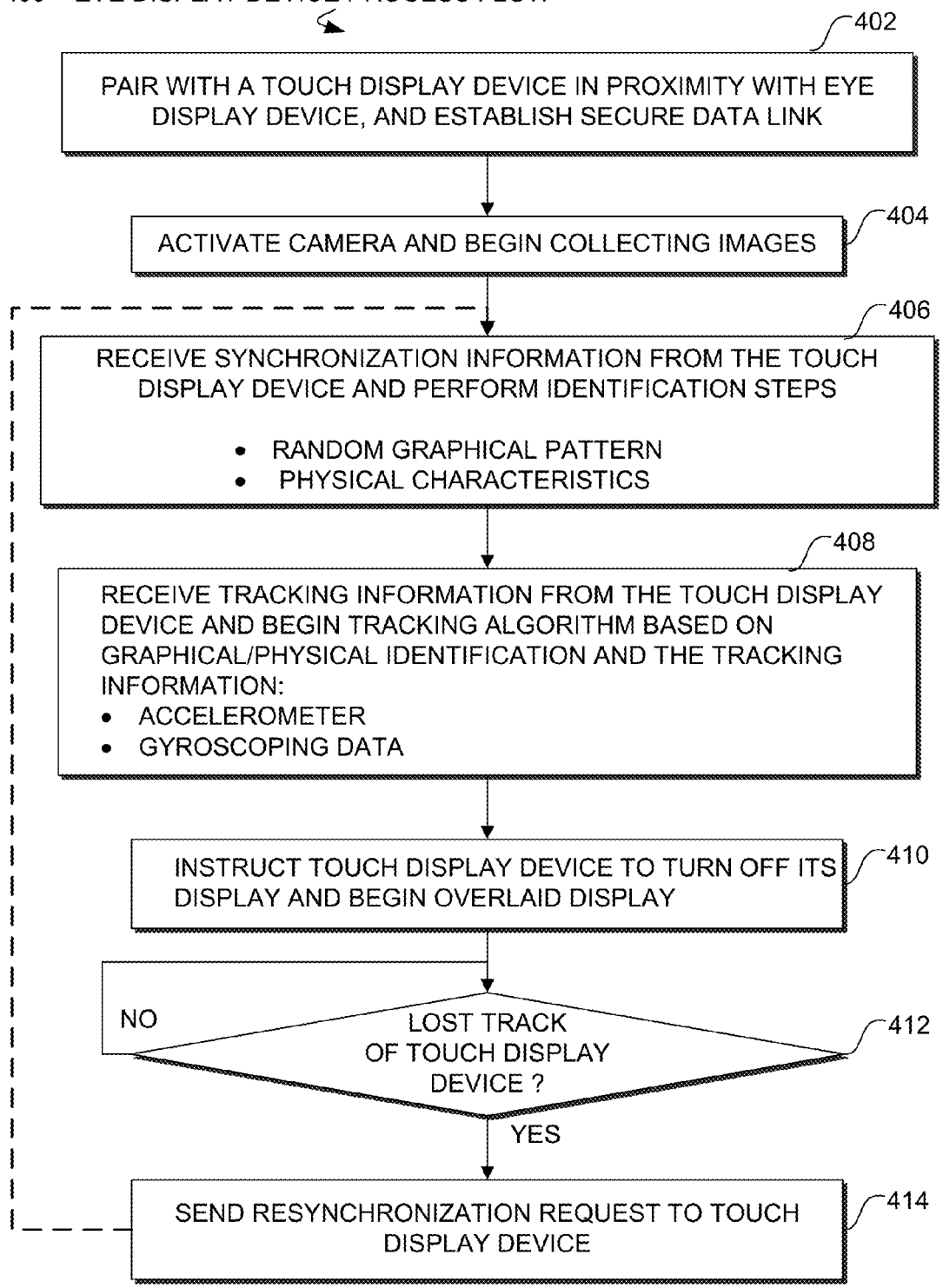
FIG. 4 is a flow diagram illustrating a process that may be utilized in an eye display device to operate in conjunction with a touch display device, in accordance with embodiments of the invention.

FIGS. 3 and 4 are flow diagrams that illustrate an overview of the processes of supporting the eye display interface system 100 of FIGS. 1 and 2 from the perspective of the touch display device 102 (FIG. 3) and from the perspective of the eye display device 108 (FIG. 4), in accordance with embodiments of the invention.

In FIG. 3, the touch display device process flow 300 begins with a process 302 in which a touch display device 102 pairs with an eye display device 108 discovered to be in sufficient proximity to support a wireless connection 118 (it should be noted that the references to the connection 118 is generally to a wireless connection; however, the described embodiments are not limited to a wireless connection and could also operate using a wired connection). Once paired, the touch display device 102 establishes a secure data link with the eye display device 108 over which information and data supporting the eye display interface system 100 is exchanged.

Touch display device process flow 300 continues with process 304 in which the touch display device 102 makes available synchronization information used in the eye display device's identification and tracking algorithms. In a typical embodiment, the synchronization information includes a random generated graphical pattern and may include other physical characteristics of the touch display device 102 that can be captured by the eye display device's camera 202. Process 304 may be repeated upon request 306 from the eye display device 108 as needed to support the identification and tracking algorithms.

Touch display device process flow 300 continues with process 308, in which the touch display device 102 supplies additional tracking information, again to support the eye display device's identification and tracking algorithms. Specifically the tracking information includes movement or position and orientation data as obtained, for example, from the touch display device's accelerometer and/or gyroscope components during operation of the touch display device 102.

In process 310, the touch display device 102 supports the separation of the display interface from the touch interface by carrying out instructions to turn off the display of the visible user interface (UI) and any other visible content, and to initiate transmission of the visible UI and content to the eye display device 108 without affecting the ability of the touch display device to receive and process touch interface input.

In decision block 312, the touch display device 102 continues to detect touch interface input as it normally would and, when detected, continues at process 314 to send updated visible UI and content to the wearable eye display device 108 so that the visible UI and content can be re-created in real-time on the wearable eye display device 108.

In FIG. 4, an eye display device process flow 400 is illustrated as might be carried out by the components of the smart glass processor 204, including the image processing component 206, the display interface component 208 and connectivity component 210. As with the touch display device process flow 300, process 400 begins with a corresponding process 402 in which the eye display device 108 pairs with a touch display device 102 discovered to be in sufficient proximity to support a wireless connection 118. Once paired, the eye display device 108 cooperates in establishing a secure data link with the touch display device 102 over which information and data supporting the eye display interface system 100 is exchanged.

Eye display device process flow 400 continues with process 404 in which the eye display device 108 activates its camera 202 and begins collecting images that will trigger the identification and tracking algorithms used to identify and track the touch display device 102 in preparation for re-creating a display interface 116 based on the touch display device's touch display interface 104. In process 406, the eye display device 108 commences the identification and tracking algorithm upon receiving from the touch display device 102 synchronization information, where the synchronization information includes a random generated graphical pattern provided by the touch display device upon request. The pattern is such that is can be used distinguish and identify the touch display device 102 from other objects appearing in the visual field of the eye display device 108, where the visual field is captured by the camera component 202 of the eye display device. The synchronization information can also include other physical characteristics of the touch display device 102 that aid in identification and tracking.

At process 408 the eye display device 108 receives tracking information from the touch display device 102 which it has identified and with which it has established a secure data link via connection 118. At this point, the eye display device 108 commences an ongoing tracking algorithm based on the tracking information received from the touch display device. The tracking information can include such data as position and orientation data obtained from the accelerometer and gyroscope sensor components of the touch display device 102 as provided over the secure data link via connection 118.

Upon successful commencement of the identification and tracking algorithms, the eye display device 108 continues at process 410 by instructing the touch display device 102 to turn off its display 106. The eye display device 108 commences re-creating the display interface 104 on the eye display interface 110 on the eye display lens 112 so that the wearer perceives the re-created display 114/116 overlaid on the dimmed touch display device 102/106 to allow normal operation of the touch display device 102. That is, the wearer can interact with their touch display device 102 using the touch interface as they normally would even though the actual display 106 of the touch interface on the touch display device 102 is no longer visible.

During operation of the eye display interface system 101, the eye display device 108 monitors, in process 412, whether or not it has sufficient information to continue to track the touch display device 102. If it loses track of the touch display device 102, then process 414 is performed to send a resynchronization request to the touch display device via the secure data link in order to reestablish the identification and tracking of the touch display device. In this manner the eye display device process flow 400 continues to support the operation of the eye display interface system 100 until it is no longer needed; for example, until the touch display device is no longer present in the visual field captured by the camera, moves out of the proximate range to support the connection to the wearable eye display device, or has been turned off or otherwise disabled.

Figure 5:
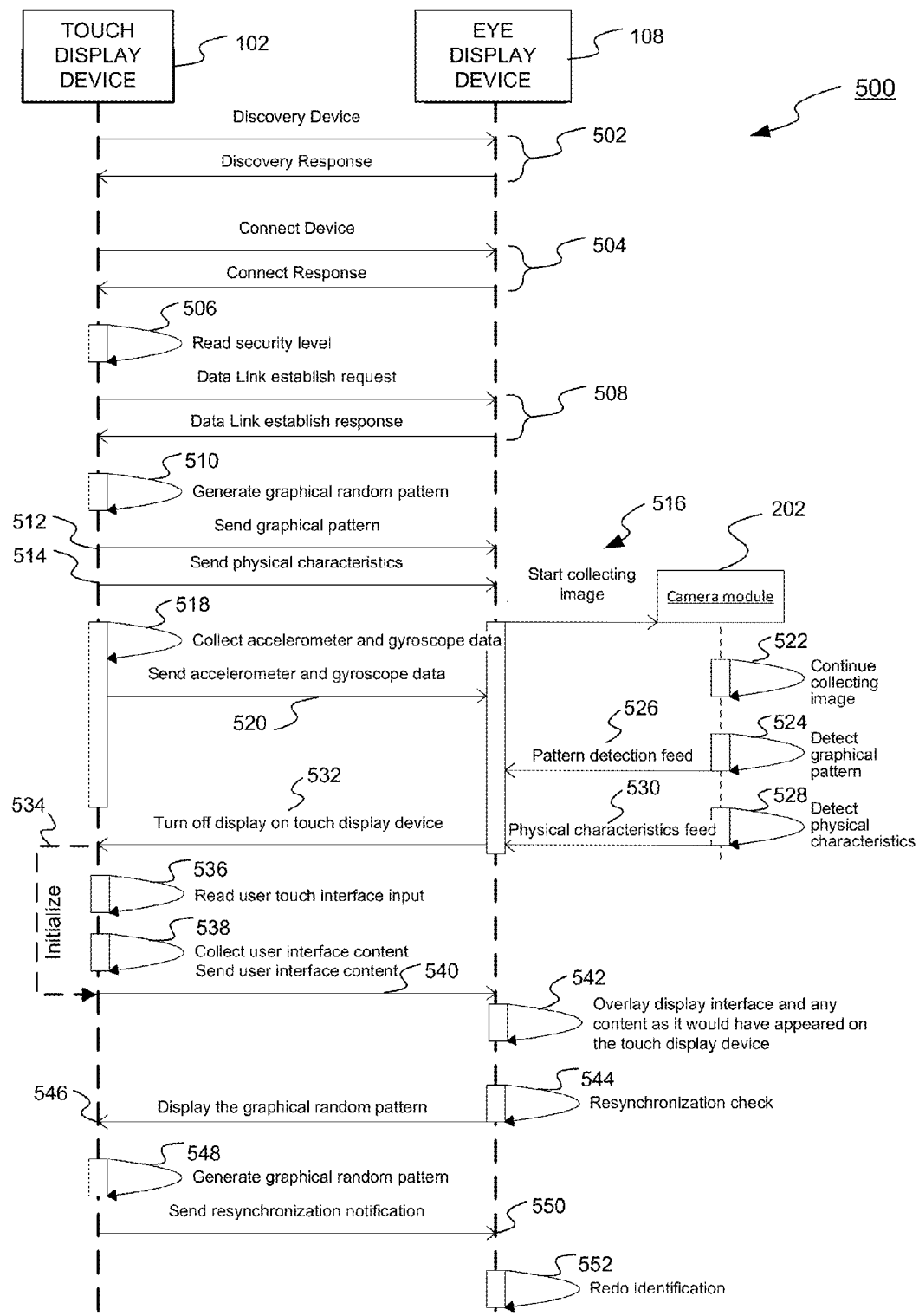
FIG. 5 is a sequencing diagram illustrating a process that may be utilized in establishing and operating an eye display interface to a touch display device in accordance with embodiments of the invention.

FIG. 5 is a sequencing diagram illustrating in further detail the processes described in FIGS. 3 and 4 in establishing and operating an eye display interface system 100 for a touch display device in accordance with embodiments of the invention.

As illustrated the processing sequence 500 of operations between the touch display device 102 depicted on the left of the sequencing diagram, and the eye display device 108 on the right, begins with mutual identification of the devices in order to pair the devices to one another using a communication protocol that supports the discovery of the devices when in proximity to one another, the connection of the devices and the establishment of a secure data link. Specifically, at reference number 502 and 504 the touch display device 102 sends a discovery/connect command to the eye display device 108, whereupon the commands are acknowledged. At reference 506 a user of the touch display device may be prompted to enter security information to establish a data link with a security level specified by the user. Depending upon the trust level and/or prior history of connections between the devices, some of the mutual identification and data link process at reference 508 may be automated without requiring the user to enter information.

Once the secure data link between the devices is established, the touch display device 102 generates 510 and displays 512 the random graphical pattern or other physical characteristics 514 so that they are available to be captured in images taken by the camera of the eye display device 108. In turn, the eye display device 108 activates the camera module 202 to start collecting images 516 that will permit the eye display device 108 to identify the touch display device 102 in the visual field captured by the camera and to begin tracking the position and orientation of the touch display device 102 relative to the eye display device 108 during operation of the processing sequence 500.

For the identification of the touch display device 102, the camera module 202 continues capturing and collecting images 522 from the visual field, and detecting the graphical pattern 524 generated and displayed on the touch display device 102. The camera module 202 optionally captures any other physical characteristics 528 of the touch display device 102 that may facilitate the identification and tracking of the device.

For the continued identification of and subsequent tracking of the touch display device 102, the pattern detection feed 526 and physical characteristics feed 530 representing what was captured and detected by the camera 202 is processed by the image processing 206 and display interface 208 components of processor 204 of the smart glass component 200 of the eye display device 108. In one embodiment, accelerometer and gyroscope data is also collected 518 and sent 520 from the touch display device 102 after the data link is established, and is processed by the eye display device 108 to aid in tracking the touch display device. Once identification and tracking is successfully initiated the eye display device 108 instructs 532 the touch display device 102 to turn off its display.

At this point in the sequence diagram of FIG. 5, during initialization 534 the eye display device 108 begins the process 542 of re-creating the touch device's display on the eye display interface 110 of the eye display device 108 so that it can be perceived by the user as it would have appeared had the display remained on the touch display device. In particular, image processing 206 and display interface 208 components of processor 204 of the smart glass component 200 of the eye display device 108 re-creates the touch device's display on the eye display interface 110 while at the same time ensuring that the eye display interface 110 is properly synchronized to the location of the touch display device in the current visual field. In a typical embodiment, entering this mode of operating the touch display device 102 using the eye display device 108 occurs without interruption such that the user can continue interacting with the touch display device as they normally would.

When the user does interact with the touch display device 102, the user touch interface input is read 536 by the touch display device, the updated content, if any, is collected 538, and the resulting updated display is sent 540 to be again re-created 542 on the eye display interface 110 of the eye display device 108. As described, the user interacts with the touch display device 102 in the same manner as they would normally, except that their visual perception of the display on the touch display device 102 is controlled with the eye display device 108. The process is repeated each time the user interacts with the touch display device 102 while wearing the eye display device 108.

As noted with reference to the flow diagrams in FIGS. 3 and 4, the operation of the eye display interface system 100 can periodically determine that it has insufficient information to continue to track the touch display device 102. If such a determination is made, a resynchronization check 544 is triggered on the eye display device 108 which, in turn, causes the eye display device 108 to instruct the touch display device 102 to again display the random graphical pattern that was originally used to identify the touch display device 108.

Upon receiving the request or instruction to again display the random graphical pattern, the touch display device 102 regenerates 548 and activates its display 550 of the random graphical pattern so that it can be captured by the eye display device 108. In turn, the eye display device 108 repeats the identification algorithm as described beginning at reference 516 in collecting images via the camera module 202 until synchronization of the eye display interface 110/116 to the display screen 104 of the touch display device 102 is achieved.

The above-described processing sequence 500 is performed between the two devices 102/108 until they move out of proximity with one another or until one or both of the devices become otherwise disabled.

Figure 6:
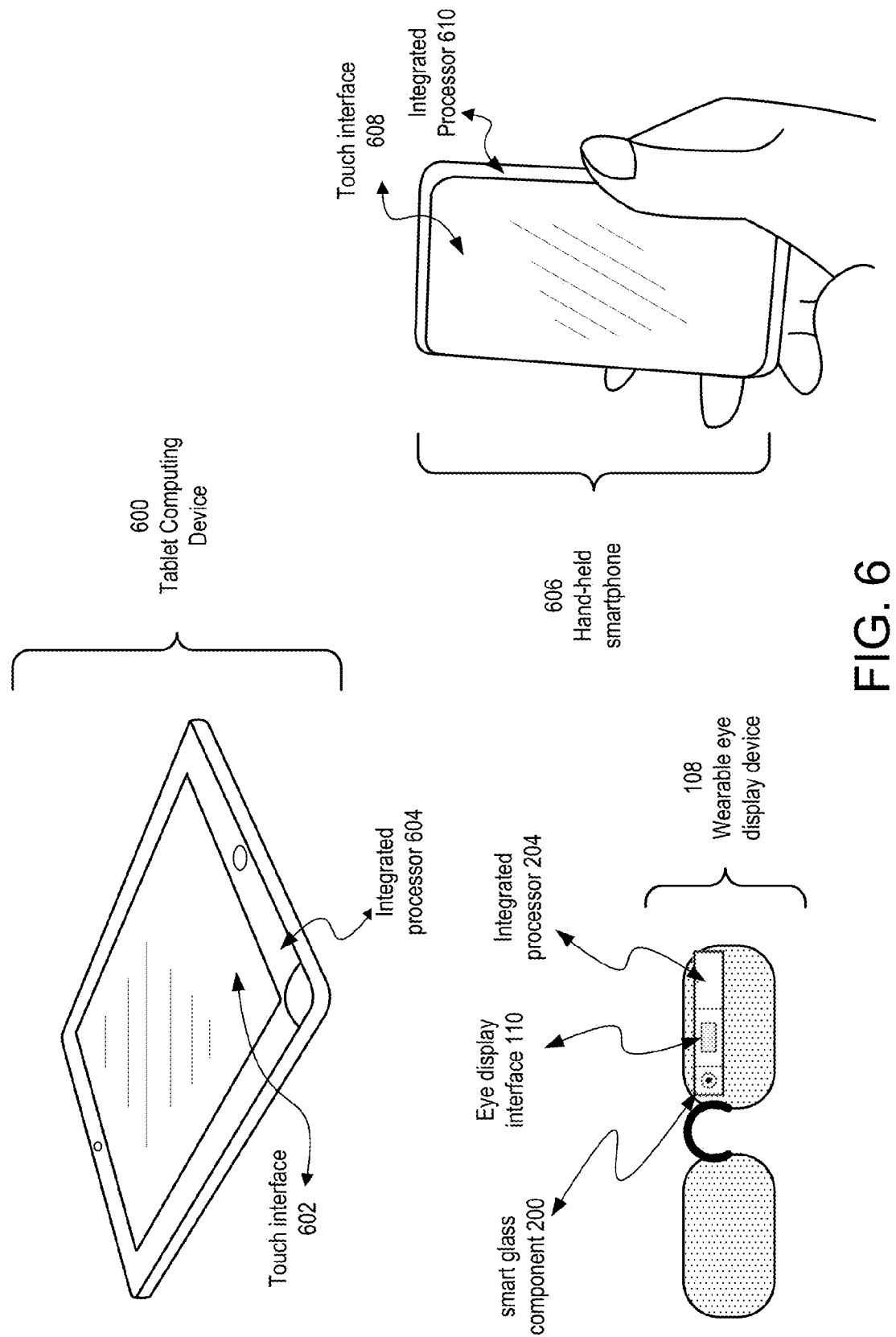
FIG. 6 illustrates examples of the touch display devices that could be used with a wearable eye display device, each having circuitry integrated therein as described in accordance with embodiments of the invention.

FIG. 6 illustrates examples of touch display devices 102 that could be used with a wearable eye display device 108, each device having circuitry integrated therein as described in accordance with embodiments of the invention. As illustrated, the tablet computing device 600 and the hand-held smart phone 606 each include a touch display interface 602/608 and an integrated processor 604/610 in accordance with disclosed embodiments. The wearable eye display device 108, as described in greater detail with reference to FIGS. 1-2, includes the smart glass component 200 containing the eye display interface 110 and its own integrated processor 204 including among other components, the previously described image processing 206, display interface 208 and connectivity 210 components.

In one embodiment, the eye display interface system 100 embodies a tablet computing device 600 or a hand-held smart phone 606 operating in conjunction with the wearable eye display device 108, in which memory, the touch display or eye display interfaces and an integrated circuit operating as an integrated processor are incorporated into each of the devices, and in which the integrated processors implement one or more of the embodiments described herein. In one embodiment, the illustrated integrated processors of the tablet, smart phone and eye display device are integrated silicon processors functioning as a central processing unit to support both the operation and connectivity of the devices, and include, among other components, logic, memory, and connectivity components.

Figure 7:
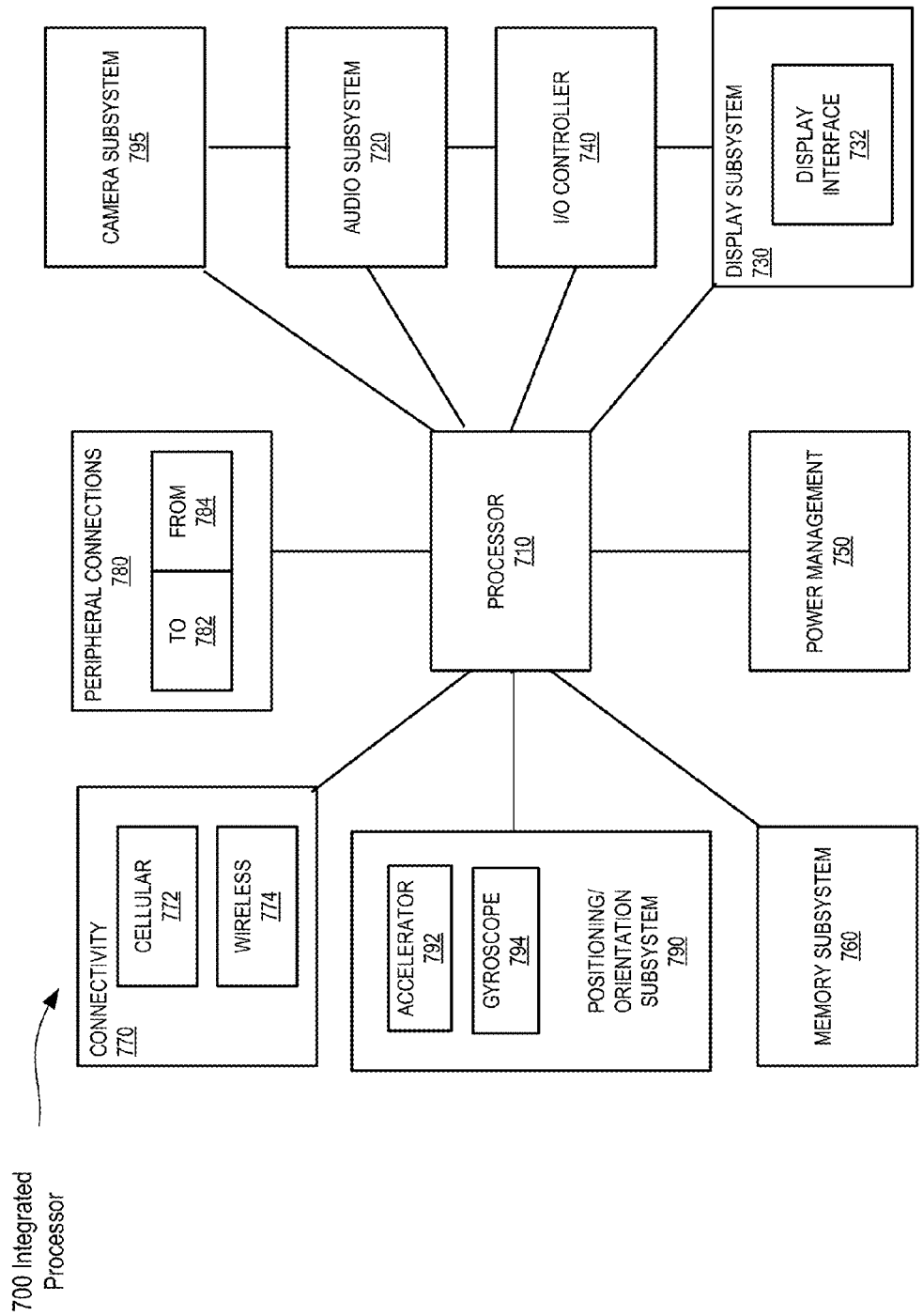
FIG. 7 is a block diagram of an exemplary integrated processor having components, some or all of which may be integrated in circuitry of the devices illustrated in FIG. 6, as described in accordance with embodiments of the invention.

FIG. 7 is a block diagram of an exemplary integrated processor having components, some or all of which may be integrated in the circuitry of the devices illustrated in FIG. 6, as described in accordance with embodiments of the invention. For example, processor 710 performs the primary processing operations. Audio subsystem 720 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 710.

Display subsystem 730 represents hardware (e.g., display devices) and software (e.g., drivers) components that provide a visual and/or tactile display for a user to interact with the tablet computing device, smart phone or wearable eye display device. Display subsystem 730 includes display interface 732, which includes the particular screen or hardware device used to provide a display to a user, including the eye display interface of the wearable eye display device. In one embodiment, display subsystem 730 includes a touch display interface that supports both display output and touch input to a user.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to the tablet computing device or smart phone through which a user might interact. In one embodiment, I/O controller 740 manages devices such as accelerometers 792 and gyroscopes 794 of a positioning/orientation subsystem 790, or cameras 795, light sensors or other environmental sensors, or other hardware (not shown) that can be included or connected to the tablet computing device, smart phone or wearable eye display device. The input can be part of direct user interaction, as well as providing environmental input to the tablet computing device, smart phone or wearable eye display device.

In one embodiment, the tablet computing device, smart phone or wearable eye display device includes power management 750 that manages battery power usage, charging of the battery, and features related to power saving operation. Memory subsystem 760 includes memory devices for storing information in the tablet computing device, smart phone or wearable eye display device.

In one embodiment, connectivity 770 includes hardware devices (e.g., wireless and/or wired connectors and communication hardware) and software components (e.g., drivers, protocol stacks) to the tablet computing device, smart phone or wearable eye display device to communicate with external devices, or with each other as described in the eye display interface system 100. Cellular connectivity 1072 may include, for example, wireless carriers such as GSM (global system for mobile communications), CDMA (code division multiple access), TDM (time division multiplexing), or other cellular service standards. Wireless connectivity 1074 may include, for example, activity that is not cellular, such as personal area networks (e.g., Bluetooth), local area networks (e.g., WiFi), and/or wide area networks (e.g., WiMax), near field communication (NFC) or other wireless communication.

Peripheral connections 780 include hardware interfaces and connectors, as well as software components (e.g., drivers, protocol stacks) to make peripheral connections as a peripheral device ("to" 782) to other computing devices, as well as have peripheral devices ("from" 784) connected to the tablet computing device, smart phone or wearable eye display device, including, for example, a "docking" connector to connect with other computing devices. Peripheral connections 780 include common or standards-based connectors, such as a Universal Serial Bus (USB) connector, DisplayPort including MiniDisplayPort (MDP), High Definition Multimedia Interface (HDMI), Firewire, etc.

It will be apparent from this description that aspects of the present invention could be embodied, at least in part, in software. That is, the techniques and methods described herein could be carried out in an eye display interface system 100 in response to one or more processors executing a sequence of instructions contained in a tangible, non-transitory memory or the non-volatile memory, or a combination of such memories in memory subsystem 760, and each of these memories is a form of a machine readable, tangible storage medium. In various embodiments, hardwired circuitry could be used in combination with software instructions to implement the present invention. Thus the techniques are not limited to any specific combination of hardware circuitry and software or to any particular source for the instructions executed by the eye display interface system.

All or a portion of the described embodiments can be implemented with logic circuitry such as a dedicated logic circuit or with a microcontroller or other form of processing core that executes program code instructions. Thus processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages could be used to implement the teachings of the invention as described herein.

In the foregoing specification, the invention has been described with reference to specific exemplary embodiments. It will be evident that various modifications could be made to the described embodiments without departing from the broader spirit and scope of the invention as set forth in the following claims. The specification and drawings are, accordingly, to be regarded in an illustrative sense rather than a restrictive sense.

As will be apparent to one skilled in the art, an embodiment of the invention can be practiced without one or more of the specific details set forth in this description. In addition, certain well-known components, structures, and techniques have not been shown in detail so as to not obscure the understanding of the invention.

Throughout the description, some of the details are set forth in terms of sequential operations. However, as will be apparent to one skilled in the art, some of the operations may be performed in a different order than described, including being performed in parallel rather than sequentially, while remaining within the scope of the invention.

Lastly, reference in the specification to "one embodiment" or "an embodiment" or "embodiments" means that a particular feature, structure, or characteristic described in connection with the embodiment can be included in at least one embodiment of the invention. The appearances of the phrase "in one embodiment," "an embodiment," or "embodiments" in various places in the specification do not necessarily all refer to the same embodiment or embodiments.

What is claimed is:

1. A wearable eye display device comprising:
   a processor coupled to a camera and a wearable lens having an eye display interface, the processor including:
      a connectivity component to establish a data link with a touch display device in communication with the wearable eye display device;
      a display interface component;
      an image component to:
         receive from the camera an image composed of objects captured in the camera's field of view, the objects including the touch display device, the touch display device having a touch interface integrated with a display interface,
         detect a graphical pattern appearing in the image, wherein the graphical pattern is a randomly generated graphical pattern of a two-dimensional mesh of easily matched geometrical forms with reference points generated with a pseudorandom number generator;
         identify the graphical pattern appearing in the image as having been generated on the display interface of the touch display device with which the connectivity component established the data link to distinguish the touch display device from the other objects captured in the camera's field of view,
         identify a location of the display interface of the touch display device based on where the identified graphical pattern appeared in the image, and
         synchronize the eye display interface with the identified location of the display interface of the touch display device the; and
      wherein the display interface component is to:
         receive the display interface of the touch display device via the data link,
         generate the display interface on the eye display interface to enable a user to use the touch interface while viewing the eye display interface, and
         command the touch display device to deactivate the display interface of the touch display device while maintaining the touch interface.

2. The wearable eye display device as in claim 1, wherein to synchronize the eye display interface with the display interface based on the image is to:
   configure the eye display interface to overlay the display interface on a portion of the eye display interface corresponding to the identified location of the display interface of the touch display device within the camera's field of view based on where the graphical pattern appeared in the image;
   track a device location of the touch display device within the camera's field of view based on position and orientation data received from the touch display device via the data link, wherein the position and orientation data is obtained from any one or both of an accelerometer and a gyroscope of the touch display device;
   identify the location of the display interface of the touch display device based on tracked device location, and
   re-configure the synchronized eye display interface to overlay the display interface on the eye display interface based on the identified location.

3. The wearable eye display device as in claim 1,
   wherein the image component is further to:
   determine that the eye display interface is no longer synchronized with the display interface; and
   re-synchronize the eye display interface with the display interface based on an updated image, wherein to re-synchronize is to:
      trigger the display interface component to command the touch display device to re-activate the display interface and generate a new graphical pattern;
      receive from the camera the updated image, the updated image composed of objects captured in the camera's field of view, the objects including the touch display device;
      detect the new graphical pattern appearing in the updated image;
      identify the new graphical pattern appearing in the updated image as having been generated on the display interface of the touch display device with which the connectivity component established the data link to distinguish the touch display device from other objects captured in the camera's field of view;

identify the location of the display interface of the touch display device based on where the new identified graphical pattern appeared in the updated image, and synchronize the eye display interface with the identified location of the display interface; and re-configure the eye display interface to overlay the display interface on the portion of the eye display interface corresponding to the identified location of the display interface.

4. A method for an eye display interface to a touch display device, the method comprising:

in a smart glass device having a camera, a processor, and a lens on which to display an eye display interface for a touch display device, the touch display device having a display interface and a touch interface:

establishing a connection with the touch display device;

capturing an image of objects in the camera's field of view, the objects including the touch display device;

detecting a graphical pattern appearing in the image, wherein the graphical pattern is a randomly generated graphical pattern of a two-dimensional mesh of easily matched geometrical forms with reference points generated with a pseudorandom number generator;

identifying the graphical pattern appearing in the image as having been generated on the display interface of the touch display device with which the connection is established to distinguish the touch display device from the other objects captured in the camera's field of view;

identify a location the display interface of the touch display device based on where the identified graphical pattern appeared in the image;

synchronizing the eye display interface with the identified location of the display interface of the touch display device;

receiving the display interface of the touch display device via the connection; and generating the display interface on the eye display interface.

5. The method as in claim 4, wherein synchronizing the eye display interface with the display interface based on the image comprises:

configuring the eye display interface to overlay the display interface on a portion of the eye display interface corresponding to the identified location of the display interface of the touch display device within the camera's field of view based on where the graphical pattern appeared in the image;

receiving location data describing a position and orientation of the touch display device via the connection, the location data having been obtained from any one or both of an accelerometer and a gyroscope operating on the touch display device;

identify the location of the display interface of the touch display device based on the received location data; and re-configure the synchronized eye display interface to overlay the display interface on the eye display interface based on the identified location.

6. The method as in claim 4, further comprising:

in the smart glass device:

determining that the eye display interface is no longer synchronized with the display interface;

re-synchronizing the eye display interface with the display interface based on the updated image, wherein re-synchronizing is to:

command the touch display device to re-activate the display interface and generate a new graphical pattern;

capture an updated image of objects in the camera's field of view, the objects including the touch display device;

receive from the camera the updated image, the updated image composed of objects captured in the camera's field of view, the objects including the touch display device;

detect the new graphical pattern as captured in the updated image;

identify the new graphical pattern as having been generated on the display interface of the touch display device with which the connection is established to distinguish the touch display device from other objects captured in the camera's field of view;

identify the location of the display interface of the touch display device based on where the new identified graphical pattern appeared in the updated image, and synchronize the eye display interface with the identified location of the display interface; and re-configure the eye display interface to overlay the display interface on the portion of the eye display interface corresponding to the identified location of the display interface.

7. At least one computer-readable storage medium including instructions that, when executed on a processor of a wearable eye display device having a camera and a lens on which to display an eye display interface to a touch display device, cause the processor to implement a method to:

establish a connection between the touch display device and the wearable eye display device;

receive an image of objects captured in the camera's field of view, the objects including the touch display device;

detect a graphical pattern appearing in the image, wherein the graphical pattern is a randomly generated graphical pattern of a two-dimensional mesh of easily matched geometrical forms with reference points generated with a pseudorandom number generator;

identify the graphical pattern appearing in the image as having been generated on the display interface of the touch display device with which the connection is established to distinguish the touch display device from the other objects captured in the camera's field of view;

identify a location the display interface of the touch display device based on where the identified graphical pattern appeared in the image;

synchronize the eye display interface with the identified location of the display interface of the touch display device;

receive the display interface of the touch display device via the connection; and generate the display interface on the eye display interface.

8. The at least one computer-readable storage medium as in claim 7, wherein to synchronize the eye display interface with the display interface based on the image comprises:

configure the eye display interface to overlay the display interface on a portion of the eye display interface corresponding to the identified location of the display interface of the touch display device within the camera's field of view based on where the graphical pattern appeared in the image.

9. The at least one computer-readable storage medium as in claim 8, wherein the method which the instructions caused the processor to implement is further to:

receive location data describing a position and orientation of the touch display device via the connection;

identify the location of the display interface of the touch display device based on the received location data; and re-configure the synchronized eye display interface to overlay the display interface on the eye display interface based on the identified location.

10. The at least one computer-readable storage medium as in claim 8, wherein the method which the instructions caused the processor to implement is further to:

determine that the eye display interface is no longer synchronized with the display interface; and receive an updated image of objects captured in the camera's field of view, the objects including the touch display device; and re-synchronize the eye display interface with the display interface based on the updated image.

11. The at least one computer-readable storage medium as in claim 8, wherein re-synchronizing the eye display interface based on the updated image is to:

command the touch display device to re-activate the display interface and generate a new graphical pattern;

receive from the camera the updated image, the updated image composed of objects captured in the camera's field of view, the objects including the touch display device;

detect the new graphical pattern as captured in the updated image;

identify the new graphical pattern as having been generated on the display interface of the touch display device with which the connection is established;

identify the location of the display interface of the touch display device based on where the new identified graphical pattern appeared in the updated image;

synchronize the eye display interface with the identified location of the display interface; and re-configure the eye display interface to overlay the display interface on the portion of the eye display interface corresponding to the identified location of the display interface.

12. The at least one computer-readable storage medium as in claim 9, wherein the location data is obtained from any one or both of an accelerometer and a gyroscope operating on the touch display device.

13. The at least one computer-readable storage medium as in claim 7, wherein the method which the instructions caused the processor to implement is further to:

receive updates to the display interface resulting from user interaction with the touch interface; and regenerate the display interface on the eye display interface to reflect the updates.

* * * * *